United States Patent
Jikei et al.

(10) Patent No.: US 8,173,046 B2
(45) Date of Patent: May 8, 2012

(54) METHOD OF PRODUCING A CONDUCTIVE POLYMER FILM

(75) Inventors: Mitsutoshi Jikei, Akita (JP); Hajimu Yasuda, Akita (JP); Hideo Yoshida, Tokorozawa (JP)

(73) Assignees: Hideo Yoshido, Saitama (JP); Akita University, Akita (JP)

( * ) Notice: Subject to any disclaimer, the term of this patent is extended or adjusted under 35 U.S.C. 154(b) by 321 days.

(21) Appl. No.: 12/597,448

(22) PCT Filed: Jun. 2, 2008

(86) PCT No.: PCT/JP2008/001384
§ 371 (c)(1),
(2), (4) Date: Oct. 23, 2009

(87) PCT Pub. No.: WO2008/155879
PCT Pub. Date: Dec. 24, 2008

(65) Prior Publication Data
US 2010/0133477 A1    Jun. 3, 2010

(30) Foreign Application Priority Data
Jun. 18, 2007 (JP) .................. 2007-159921

(51) Int. Cl.
| H01B 1/12 | (2006.01) |
| B05D 3/12 | (2006.01) |
| C08G 61/12 | (2006.01) |
| C08G 73/00 | (2006.01) |
| C08L 65/00 | (2006.01) |
| C08L 79/00 | (2006.01) |

(52) U.S. Cl. .............................. 252/500; 528/196
(58) Field of Classification Search .......... 252/500; 528/196, 214, 491; 428/922
See application file for complete search history.

(56) References Cited

U.S. PATENT DOCUMENTS

| 5,840,214 | A  | * | 11/1998 | Kinlen ................. 252/500 |
| 6,984,341 | B2 | * | 1/2006 | Go et al. ............... 252/500 |
| 7,850,871 | B2 | * | 12/2010 | Jiang et al. ............ 252/500 |
| 2005/0007430 | A1 | * | 1/2005 | Rowe et al. ........... 347/95 |
| 2011/0071265 | A1 | * | 3/2011 | Osada et al. .......... 526/256 |
| 2011/0101282 | A1 | * | 5/2011 | Hua et al. ............. 252/500 |

FOREIGN PATENT DOCUMENTS

| JP | 2002-220484 |   | 8/2002 |
| JP | 2004-143570 |   | 5/2004 |
| JP | 2006-328610 A1 | * | 12/2006 |
| JP | 2007-254764 |   | 10/2007 |

OTHER PUBLICATIONS

Jikei et al "Electrochemical polymerization of water-soluble and insoluble monomers in supercritical carbon dioxide-in-water emulsion", Polymer 48(2007) 2843-2852.*
Kobayashi, Yukio; "Doudenseikoubunshi no Saishin Ouyou Gijyutsu (New Applied Technology of Conductive Polymer)", Apr. 30, 2004 (First Edition), CMC Publishing, pp. 17-18, (no Eng lang trans/Ab).

* cited by examiner

*Primary Examiner* — Mark Kopec
(74) *Attorney, Agent, or Firm* — Jordan and Hamburg LLP

(57) ABSTRACT

A conductive polymer film is produced by drying out a solution of conductive polymer and a dopant thereof to obtain a dried film.
A dried film obtained from the solution is treated, in a reaction vessel, with an organic solvent and pressurized carbon dioxide.

10 Claims, 8 Drawing Sheets

Stability of Conductivity of PEDOT/PSS Film Treated with Supercritical Carbon Dioxide-Methanol Sample 1, 2 (1h Treatment) 3 (Overnight Treatment)

(a) (b) (c)

(d) (e)

(f) (g)

Relation between Additive Amount of Methanol and Conductivity of the PEDOT/PSS Film Relation between Supercritical Carbon Dioxide-Methanol (4%) Treating Time and Conductivity of the PEDOT/PSS Film Stability of Conductivity of PEDOT/PSS Film Treated with Supercritical Carbon Dioxide-Methanol Sample 1, 2 (1h Treatment) 3 (Overnight Treatment)

(a)

(b)

(c)

(d)

(e)

(f)

(g)

(a)

(b)

(c)

(d)

(e)

(f)

(g)

Relation between Treating Condition to PEDOT/PSS Film and Conductivity

Conductivity(S/cm)

Effect of DMSO Amount in Supercritical Carbon Dioxide-DMSO Treatment on Conductivity (35°C, 12Mpa, 30min)

DMSO (vol%)

(a) Untreated, b) Supercritical Carbon Dioxide Treatment,
c) Supercritical Carbon Dioxode-Methanol Mixture Treatment)

(a) (b) (c) (d)

(e) (f)

(g) (h)

US 8,173,046 B2

METHOD OF PRODUCING A CONDUCTIVE POLYMER FILM

BACKGROUND OF THE INVENTION

The present invention relates to a method for producing a conductive polymer film suitable for, for example, enhancing electrical conductivity of a PEDOT/PSS film capable of being manufactured quickly and at low cost with simple operation, enhancing electrical conductivity of the PEDOT/PSS film significantly, and obtaining stable properties of the film.

When considering conductive polymer as industrial material, it is required that electric conductivity (hereinafter called conductivity), processability, and stability are above a certain level.

From this point of view, only polypyrrole, polyaniline, polythiophene (poly-3,4-ethylenedioxythiophene, hereinafter called PEDOT) are practically used.

Of them, PEDOT, which enables structure control by introducing a substituent group, has high conductivity, excellent stability in air, and heat resistance. It is in practical use as antistatic material for photographic film and is widely used as cathode material for electrolytic capacitor (see non-patent document 1).

However, PEDOT which is now commercially available has high performance in film depositing using polyelectrolyte (polystyrene sulfonic acid, hereinafter called PSS), as a dopant. Thus, the conductivity decreases by 2 to 3 than the case a low molecular dopant is used. Therefore, the purpose is limited and it has been desired to provide improvement.

On the other hand, when forming a PEDOT/PSS film by using PSS to the PEDOT, it is known that the conductivity of the PEDOT/PSS film improved by adding dimethyl sulfoxide (hereinafter called DMSO), a polar solvent.

However, in the way of adding DMSO, the production cost is increased since DMSO is expensive. In addition, when removing the remaining solvent after adding DMSO in the manufacturing process, the treating cost is increased because DMSO boils at high point. Moreover, a small amount of DMSO remains on the film so that there is a problem of stability of properties after forming a film.

Heretofore, the applicant has suggested a method of producing a conductive organic film in which a pair of electrodes is received in a reaction vessel, a polymerization solution made by aniline and supercritical carbon dioxide is introduced into the reaction vessel, a surfactant is introduced thereinto to make an emulsion, and then a polyaniline film is deposited on a member to be treated, one of the electrode, under supercritical state (for example, patent document 1).

However, above-mentioned method of conductive organic film requires expensive aniline and a power source. The operation of deposition is complicated, and thus the production cost is increased. Further, the conductivity of the polyaniline film is about 5 S/cm, which is substantially low.

[Non-patent document 1] Kobayashi, Yukio. 'Doudenseikoubunshi no Saishin Ouyou Gijyutsu [New Applied Technology of Conductive Polymer]' 2004 Apr. 30 (First Edition) CMC Publishing. Page. 17-18.

[Patent Document 1] Japanese Published Unexamined Patent Application No. 2004-143570

SUMMARY OF THE INVENTION

It is an object of the present invention to provide, in order to solve the above-mentioned problems, a method of producing a conductive polymer film, which is suited to improve conductivity of a PEDOT/PSS film, for example, in which the film is produced with simple operations, at low cost and rapidly, in which the conductivity of the PEDOT/PSS film is significantly enhanced, and in which stable physical properties of film can be obtained.

According to the present invention, in a method of producing a conductive polymer film by drying out a solution of a conductive polymer and a dopant thereof, a dried film obtained from the solution is treated with a predetermined organic solvent and pressurized carbon dioxide in a reaction vessel, and the solvent and pressurized carbon dioxide penetrate into the dried film. Thus, it reforms or improves the properties of the film promptly in a simple manner and it significantly enhances the conductivity of the treated film compared with a treatment when only organic solvent is used.

According to a second aspect of the present invention, the pressurized carbon dioxide is subcritical or supercritical carbon dioxide, liquefied carbon dioxide, or pressurized carbon dioxide gas. When subcritical or supercritical carbon dioxide is used, reliable and stable film and the desired conductivity is obtained. When the pressurized carbon dioxide gas is used, the film can be formed easily with inexpensive equipment, and increased productivity is obtained.

According to a third aspect of the present invention, the pressurized carbon dioxide is subcritical or supercritical carbon dioxide, and the dried film is treated in a uniform phase made by the organic solvent and subcritical or supercritical carbon dioxide. Thus, reliable and stable film is formed and desired conductivity of the film is obtained.

According to a fourth aspect of the present invention, the pressurized carbon dioxide is liquefied carbon dioxide, and the dried film is treated in a liquid phase made by the liquefied carbon dioxide and the organic solvent. Thus, stable and homogeneous film can be obtained at relatively low cost under the uniform phase of liquefied carbon dioxide and the organic solvent.

According to a fifth aspect of the present invention, the pressurized carbon dioxide is pressurized carbon dioxide gas, and the dried film is treated in a vapor phase made by the pressurized carbon dioxide gas and the organic solvent. Thus, the dried film does not need to be immersed into the liquefied carbon dioxide and the organic solvent, and thus, the state of immersion does not need to be checked, which is cumbersome. The film can be produced easily and rationally and the film can be produced with low pressurized carbon dioxide. Thus, the film is formed more easily, film-forming equipment is inexpensive and increased productivity is obtained.

According to a sixth aspect of the present invention, the pressurized carbon dioxide gas has a pressure of 0.1 MPa to 7.0 MPa. Thus, the film is formed more easily with low pressurized carbon dioxide, and a cost of film-forming equipment becomes cheaper compared with a case supercritical carbon dioxide or liquefied carbon dioxide is used.

According to a seventh aspect of the present invention, the solution of the conductive polymer and the dopant (dispersion solution) thereof is a PEDOT (poly-3,4-ethylenedioxythiophene)/PSS (polystyrene sulfonic acid) solution. Thus, the conductivity of the PEDOT/PSS film is significantly enhanced. Conventional problem, which is much lower conductivity the case low molecular dopant is used, has been solved and use limitation is removed.

According to an eighth aspect of the present invention, the organic solvent has a highly polar solvent added thereto. Thus, use of inexpensive solvent enhances the conductivity of the treated film significantly and the film is produced easily and at low cost.

According to a ninth aspect of the present invention, the organic solvent is methanol, ethylene glycol, or DMSO (dimethyl sulfoxide). Thus, the conductivity of the PEDOT/PSS film is significantly enhanced. Moreover, methanol and ethylene glycol are inexpensive, and of them, methanol boils at low point. Thus, a conductive polymer film is produced inexpensively and rapidly, and the solvent remaining on the treated film can be removed easily and rapidly.

According to a tenth aspect of the present invention, after the above-mentioned treatment, the solvent remaining on the treated film is removed to obtain stable properties of a conductive polymer.

According to the first aspect of the present invention, a dried film obtained from a solution of a conductive polymer and a dopant is treated with a predetermined organic solvent and pressurized carbon dioxide in a reaction vessel, and the solvent and pressurized carbon dioxide penetrate into the dried film. Thus, it reforms or improves the properties of the film quickly in a simple manner and it significantly enhances the conductivity of the treated film compared with a treatment when only an organic solvent is used.

According to the second aspect of the present invention, the pressurized carbon dioxide is subcritical or supercritical carbon dioxide, liquefied carbon dioxide, or pressurized carbon dioxide gas. When subcritical or supercritical carbon dioxide is used, reliable and stable film is formed and the desired conductivity of the film is obtained. When the pressurized carbon dioxide gas is used, the film can be formed easily with inexpensive equipment, and increased productivity is obtained.

According to the third aspect of the present invention, the pressurized carbon dioxide is subcritical or supercritical carbon dioxide, and the dried film is treated in a uniform phase made by the organic solvent and subcritical or supercritical carbon dioxide. Thus, reliable and stable film is formed and the desired conductivity of the film is obtained.

According to the fourth aspect of the present invention, the pressurized carbon dioxide is liquefied carbon dioxide, and the dried film is treated in a liquid phase made by the liquefied carbon dioxide and the organic solvent. Thus, stable and homogeneous film can be obtained at relatively low cost under the uniform phase of liquefied carbon dioxide and the organic solvent.

According to the fifth aspect of the present invention, the pressurized carbon dioxide is pressurized carbon dioxide gas, and the dried film is treated in a vapor phase made by the pressurized carbon dioxide gas and the organic solvent. Thus, the dried film does not need to be immersed into the liquefied carbon dioxide and the organic solvent, and thus, the state of immersion does not need to be checked, which is cumbersome. The film can be produced easily and rationally and the film can be produced with low pressurized carbon dioxide. Thus, the film is formed more easily, a cost of a film-forming equipment becomes cheaper.

According to the sixth aspect of the present invention, the pressurized carbon dioxide gas has a pressure of 0.1 MPa to 7.0 MPa. Thus, the film is formed more easily with low pressurized carbon dioxide, and a cost of film-forming equipment becomes cheaper compared with a case supercritical carbon dioxide or liquefied carbon dioxide is used and the productivity is increased.

According to the seventh aspect of the present invention, the solution of the conductive polymer and the dopant (dispersion solution) thereof is a PEDOT (poly-3,4-ethylenedioxythiophene)/PSS (polystyrene sulfonic acid) solution. Thus, the conductivity of the PEDOT/PSS film is significantly enhanced. Conventional problem, which is much lower conductivity the case low molecular dopant is used, has been solved and use limitation is removed.

According to eighth aspect of the present invention, the organic solvent has a highly polar solvent added thereto. Thus, use of inexpensive solvent enhances the conductivity of the treated film significantly and the film can be produced easily and at low cost.

According to the ninth aspect of the present invention, the organic solvent is methanol, ethylene glycol, or DMSO (dimethyl sulfoxide). Thus, the conductivity of the PEDOT/PSS film is significantly enhanced. Moreover, methanol and ethylene glycol are inexpensive, and of them, methanol boils at low point. Thus, a conductive polymer film is produced inexpensively and rapidly, and the solvent remaining on the treated film can be removed easily and rapidly.

According to the tenth aspect of the present invention of claim 10, after the above-mentioned treatment, the solvent remaining on the treated film is removed to obtain stable properties of a conductive polymer.

BRIEF DESCRIPTION OF THE DRAWINGS

FIG. 1(a) shows a state in which a PEDOT/PSS solution used for the present invention is received. FIG. 1(b) shows a state in which a necessary amount of the PEDOT/PSS solution is collected with a micropipette and is applied to a glass. FIG. 1(c) shows a state in which the PEDOT/PSS solution is vacuum-dried by being received in a drying chamber after it has been allowed to dry naturally. FIG. 1(d) shows a state in which the vacuum-dried PEDOT/PSS film is received in the reaction vessel, and in which the methanol is received in the reaction vessel. FIG. 1(e) shows a state of treatment in which supercritical carbon dioxide is formed in the reaction vessel and is penetrated into the dried PEDOT/PSS film which is dried out with methanol. FIG. 1(f) shows a state in which the supercritical carbon dioxide is discharged after the above-mentioned treatment, the PEDOT/PSS treated film is taken out from the reaction vessel and stored in a drying room, the drying room is heated for vacuum drying, and a solvent remaining on the PEDOT/PSS treated film is removed. FIG. 1(g) shows a state in which the PEDOT/PSS treated film is taken out from the drying chamber.

FIG. 6(a) shows a state in which the PEDOT/PSS solution used for the present invention is received. FIG. 6(b) shows a state in which a necessary amount of the PEDOT/PSS solution is collected with a micropipette and is applied to a glass. FIG. 6(c) shows a state in which the PEDOT/PSS solution is vacuum-dried by being received in a drying chamber after it has been allowed to dry naturally. FIG. 6(d) shows a state in which the vacuum-dried PEDOT/PSS film is received in a reaction vessel, and in which methanol is received in the reaction vessel. FIG. 6(e) shows a state of treatment in which liquefied carbon dioxide is introduced into the reaction vessel containing methanol to form a solution of the liquefied carbon dioxide and the methanol in which the dried PEDOT/PSS film is immersed, and the methanol penetrates into the dried PEDOT/PSS film. FIG. 6(f) shows a state in which the liquefied carbon dioxide is discharged after the above-mentioned treatment, the treated PEDOT/PSS film is taken out from the reaction vessel and transferred to the drying chamber, the drying chamber is heated for vacuum drying, and methanol remaining on the PEDOT/PSS treated film is thereby removed. FIG. 6(g) shows a state in which the treated PEDOT/PSS film is taken out from the drying chamber.

FIG. 10(a) shows a state in which the PEDOT/PSS solution used for the present invention is received. FIG. 10(b) shows a state in which a necessary amount of the PEDOT/PSS solution is collected with micropipette and is applied to a glass. FIG. 10(c) shows a state in which PEDOT/PSS solution is received in a spin coater, and the spin coater is rotated to form a film. FIG. 10(d) shows a state in which the PEDOT/PSS film is received in a drying chamber for vacuum drying. FIG. 10(e) shows a state in which the vacuume-dried PEDOT/PSS film is received in upper part of the reaction vessel, and methanol is received therebelow in the reaction vessel. FIG. 10(f) shows a state of treatment in which liquefied carbon dioxide is introduced into the reaction vessel, the dried PEDOT/PSS film is left to stand in an atmosphere including carbon dioxide gas and a small amount of methanol vapor, above the liquid level of a solution of methanol and liquefied carbon dioxide and methanol vapor penetrates into the dried film. FIG. 10(g) shows a state in which the liquefied carbon dioxide is discharged after the above-mentioned treatment, the treated PEDOT/PSS film is taken out from the reaction vessel and transferred to the drying chamber, the drying chamber is heated for vacuum drying, and methanol remaining on the treated PEDOT/PSS film is removed. FIG. 10(h) show a state in which the PEDOT/PSS treated film is taken out from the drying chamber.

DETAILED DESCRIPTION OF THE INVENTION

Figure 1:
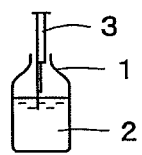
FIG. 1 is an illustration showing one embodiment of the present invention serially.
Figure 1:
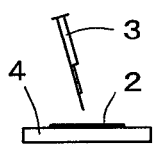
Figure 1:
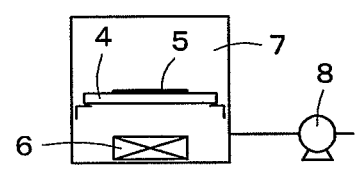
Figure 1:
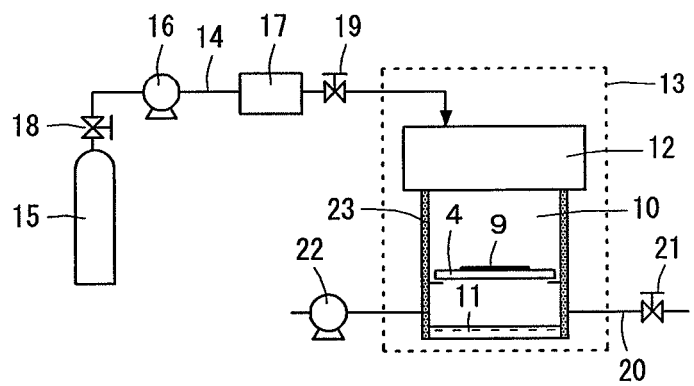
Figure 1:
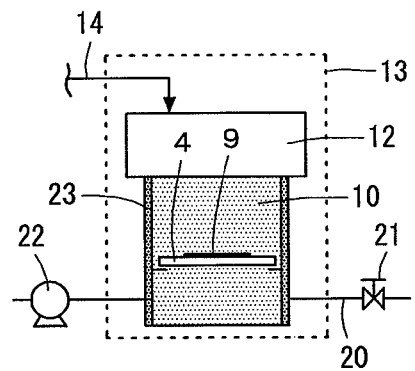
Figure 1:
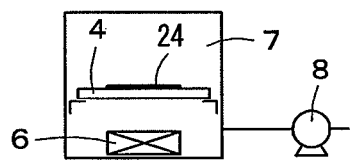
Figure 1:
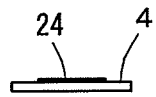

An illustrated embodiment of the present invention will be described hereinafter, in which supercritical carbon dioxide is used as pressurized carbon dioxide and enhances the conductivity of the PEDOT/PSS film. FIG. 1 shows a production method of a first embodiment in order. In FIG. 1(a), a reference numeral 1 denotes a vessel containing a PEDOT/PSS solution (purchased from Aldrich. Co./1.3 wt % dispersion in water) 2, PEDOT being a film-forming material and PSS being a dopant of PEDOT.

As shown in FIG. 1(b), a predetermined amount of the PEDOT/PSS solution 2 is collected using a micropipette 3 having a capacity of 50 µL. The solution is applied to a 1 cm×2 cm rectangular glass plate 4, which acts as a film-forming tool, on which the solution forms a film. Then, it is left overnight and allowed to dry naturally to make a first dried film 5.

Then, the first dried film 5 is received in a drying chamber 7 equipped with a heater 6 and a vacuum pump 8 (FIG. 1(c)). The drying chamber 7 is evacuated and heated to 100 degrees Celsius for vacuum drying the first dried film 5 for 30 minutes.

After this, temperature in the drying chamber 7 is raised to 200 degrees Celsius and vacuum drying is continued for one minute. The remaining solvent of the solution 2, namely water, is removed, resulting in a second dried PEDOT/PSS film on the glass plate 4. The thickness of the second dried film 9 is about 2 to 3 µL. In this case, the producing method of the second dried film 9 is not limited to what is described above.

Then, the second dried film 9 is received in a pressure-resistant reaction vessel 10 having a capacity of 24 mL, 1 mL of methanol 11, an organic solvent for improving the conductivity, is put in the vessel 10, and the pressure-resistant reaction vessel 10 is made air tight with the cover body 12.

The pressure-resistant reaction vessel 10 is received in a constant temperature vessel 13, in this embodiment, received in a constant temperature tank 13 and left for 15 minutes in the constant temperature tank 13. Temperature in the pressure-resistant reaction vessel 10 is maintained at 35 degrees Celsius.

The pressure-resistant reaction vessel 10 communicates through a conduit with a gas cylinder 15 containing liquid carbon dioxide, from which carbon dioxide as a supercritical fluid can be formed.

Inserted into the conduit 14 are a high-pressure pump 16, a refrigeration circuit (not shown), and a heater 17 and introduces the carbon dioxide into the pressure-resistant reaction vessel 10. The pressure-resistant reaction vessel 10 is pressurized to 12 MPa, and supercritical state of the carbon dioxide is formed in the reaction vessel 10. This state is shown in FIG. 1(d).

In the drawings, reference numerals 18, 19 denote on-off valves inserted into the conduit 14, a reference numeral 20 denotes a discharge pipe communicating with the pressure-resistant reaction vessel 10, and a back pressure valve 21 is inserted in the pipe 20. Reference numeral 22 represents a vacuum pump communicating with the pressure-resistant reaction vessel 10. Reference numeral 23 represents a heater attached on a periphery of the pressure-resistant reaction vessel 10.

After the pressure-resistant reaction vessel 10 is air tightly closed, the pressure-resistant reaction vessel 10 is received in the constant temperature tank 13, in which temperature is set at 35 degrees Celsius, for 15 minutes, and temperature in the pressure-resistant reaction vessel 10 is set at 35 degrees Celsius.

After this, carbon dioxide in the gas cylinder 15 is introduced into the pressure-resistant reaction vessel 10 through the high-pressure pump 16, and the pressure-resistant reaction vessel 10 is pressurized to 12 MPa and whereby the supercritical state of the carbon dioxide is formed in the vessel 10. This state is shown in FIG. 1(e).

As discussed above, the PEDOT/PSS second dried film 9 is treated by penetration thereinto of the supercritical carbon dioxide and methanol, and the thereby treated PEDOT/PSS film 24 has properties which are improved relative to the dried film 9.

In the process of producing the treated film 24, pressure in the pressure-resistant reaction vessel 10 is stabilized and after an hour passed since the supercritical carbon dioxide starts to penetrate into the PEDOT/PSS second dried film 9, the supercritical carbon dioxide in the pressure-resistant reaction vessel 10 is slowly released through a back pressure valve 21 to return the pressure in the vessel 10 to atmospheric pressure.

After this, the treated PEDOT/PSS film 24 is taken out from the pressure-resistant reaction vessel 10 with the glass plate 4, and they are received in the drying chamber 7.

The drying chamber 7 is evacuated and heated to 100 degrees Celsius, after thus vacuum drying for 10 minutes, the temperature is raised to 200 degrees Celsius and vacuum drying is continued for 5 minutes. This procedure vaporizes and removes methanol remaining on the treated PEDOT/PSS film 24. This state is shown in FIG. 1(f).

In this case, a way of removing the remaining solvent on the treated film 24 is not limited to the method previously described and draught drying and air seasoning can also be selected. In case of heat drying, like previously described, methanol, which is the solvent, boils at low point (64.6 degrees Celsius), and thus, the remaining solvent is removed easily and quickly.

After this, the PEDOT/PSS treated film 24 is taken out from the drying chamber 7 as shown in FIG. 1(g), and the thickness and electrical resistance are measured for calculation of conductivity.

In the embodiment, the thickness is determined by step measurement by using surface roughness meter. The electrical resistance value is measured by four-probe method using resistance thermometer. The conductivity of the film is calculated based on the following arithmetic expression: Conductivity (S/cm)=1/Ω (Resistance Value)×4.532×Thickness. The value of 4.532 is used as resistivity correction factor. As a result, conductivity obtained by the PEDOT/PSS treated film 24 is 45.5 S/cm.

On the other hand, to confirm the experimental result, the inventors measured the conductivity, in the same manner as previously described, of various kinds of PEDOT/PSS films before supercritical carbon dioxide treatment is carried out. The conductivity obtained from the second dried film 9 is 0.1 S/cm, which is 2 to 3 lower than when low-molecular dopant (toluenesulfonic acid) is used.

Moreover, the conductivity of the film which was obtained by adding methanol when forming the first dried film 5 was 0.11 S/cm, which was the same conductivity as the second dried film 9.

Accordingly, the conductivity of the treated PEDOT/PSS film 24 which was treated with supercritical carbon dioxide in the presence of methanol is 45.5 S/cm. It is confirmed that the conductivity of the first dried film 5 is improved more than about 400 times.

The mechanism of the improved conductivity has not yet been proven. However, it is considered that the treatment with of methanol as solvent in the embodiment changed dispersion state and interaction of dopant (PSS) and conductive polymer chain (PEDOT), and thus the internal structure of the PEDOT/PSS treated film 24 is changed into a state which is suited for conducting electrons.

Furthermore, to check the experimental result, when the inventors checked effects on conductivity of the solvent which is to be added to the treatment with supercritical carbon dioxide, improvement of the conductivity was not observed in the treatment in which no solvent is added and only supercritical carbon dioxide is used.

On the other hand, when highly polar solvent such as methanol, dimethyl sulfoxide (DMSO) is added, the conductivity is as high as 45.5 S/cm, 41.2 S/cm respectively. Meanwhile, the conductivity of chloroform, a nonpolar solvent, is 0.10 S/cm, little improvement being provided by use of nonpolar solvent.

Accordingly, addition of highly polar solvent is considered to be effective. The conductivity of ethanol and methylpyrrolidone is 5.25 S/cm, 3.59 S/cm respectively, which is low. Thus, contributory factors which improve the conductivity may exist besides polarity of solvent.

Next, to check the experimental result, the inventors measured the conductivity of the treated PEDOT/PSS film 24 by changing the amount of methanol which was added to the supercritical carbon dioxide.

Figure 2:
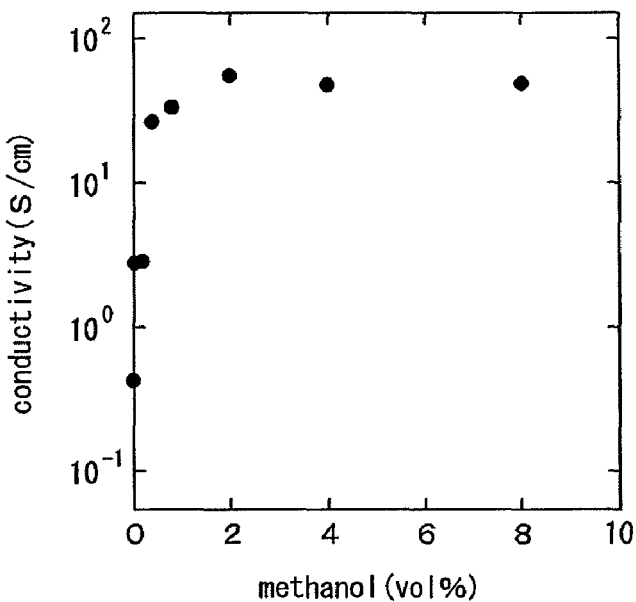
FIG. 2 is a graph showing the relation between the additive amount of methanol and conductivity of the PEDOT/PSS film in the present invention.

The result is as shown in FIG. 2. The conductivity rose by single digit by addition of small amount (10 μL). When the additive amount is more than about 1%, the conductivity is about 50 S/cm.

The data is equivalent to about 500 times of conductivity of the second dried film 9 of 0.1 S/cm. It is confirmed that adding methanol is effective and significant improvement in conductivity is observed. Moreover, it is observed that the conductivity is stable from about 60 to 70 S/cm when methanol is added an amount of about 2 to 4%.

In addition, the inventors checked the relation between time of supercritical carbon dioxide treatment and conductivity when methanol is added in an amount of 4%.

Figure 3:
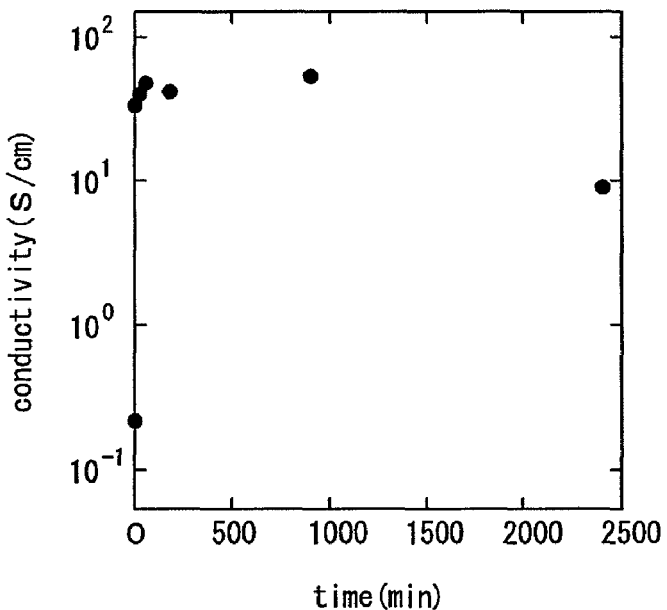
FIG. 3 is a graph showing the relation between treating time of supercritical carbon dioxide-methanol and conductivity of the PEDOT/PSS film.

The result is shown in FIG. 3. Significant improvement in conductivity is observed even in 5 minutes treatment. When the time of treatment exceeds about an hour, the value remains almost the same. In 40 hours of treatment, decrease in the conductivity is observed. Accordingly, it is confirmed that effect of the supercritical carbon dioxide treatment can be obtained in relatively a short time.

On the other hand, the inventors observed effect on conductivity of the treated PEDOT/PSS film 24 when methanol is added in an amount of 4% and temperature and/or pressure of the supercritical carbon dioxide is changed. The result obtained is shown in Table 1.

TABLE 1

| Pressure (MPa) | Temperature (° C.) | Conductivity (S/cm) |
| --- | --- | --- |
| 7 | 35 | 47.6 |
| 12 | 35 | 47.8 |
| 20 | 35 | 36.8 |
| 12 | 35 | 51.9 |
| 12 | 50 | 53.5 |
| 12 | 80 | 46.0 |

(Methanol 4%, 35° C., Treating Time: 1 h)

According to Table 1, when the temperature and/or pressure is changed, the conductivity of the treated PEDOT/PSS film 24 changed little. Moreover, the conductivity is decreased under high pressure (20 MPa) and high temperature (80 degrees Celsius), and improvement of the conductivity was not particularly observed near critical point (35 degrees Celsius, 7 MPa). Accordingly, it is considered that the supercritical carbon dioxide treatment uncorrelated with change of temperature and/or pressure.

Moreover, the inventors added methanol in amount of 4% to the treated PEDOT/PSS film 24 of different thicknesses. Then, supercritical carbon dioxide treatment is carried out in a manner previously described and tested effects of thickness of the PEDOT/PSS film on improved conductivity. The result is shown in Table 2. In the Table, "untreated" shows a state of the second dried film 9 which is before supercritical carbon dioxide treatment is carried out.

TABLE 2

| Thickness (μm) | 3 | 10 | 20 |
|---|---|---|---|
| Untreated (S/cm) | 0.11 | 0.31 | 0.32 |
| $CO_2$—MeOH Treatment (S/cm) | 40.1 | 11.9 | 14.7 |

(Methanol 4%, 35° C., 12 MPa, Treating Time: 1 h)

According to Table 2, it is observed that the conductivity is increased by 40-360 times in any thickness film which is treated with supercritical carbon dioxide compared with untreated. In supercritical carbon dioxide treatment, films having thickness of 10 μm or 20 μm have lower conductivities than the film having thickness of 3 μm, and it is considered that optimization of treatment condition is needed.

Figure 4:
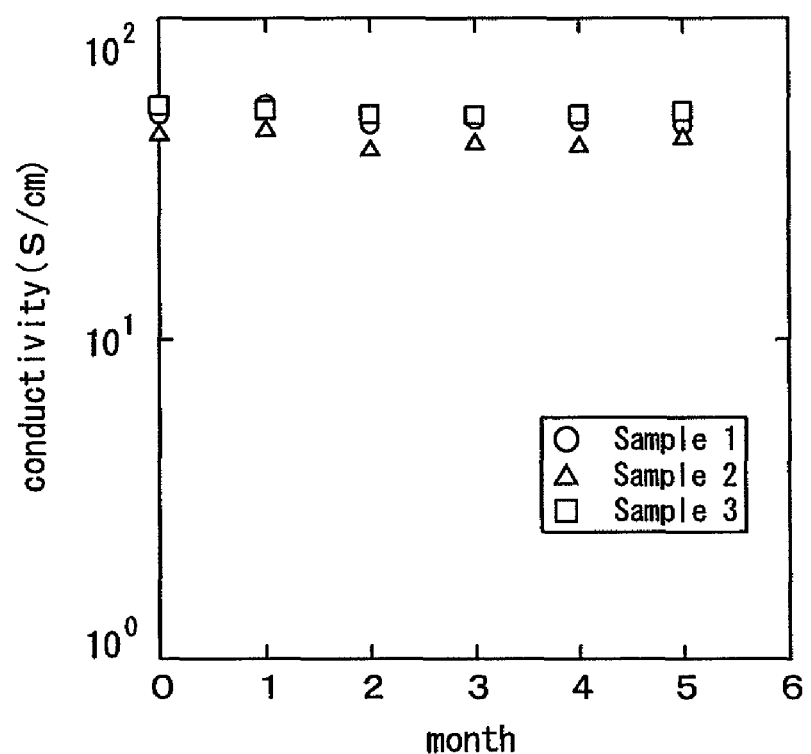
FIG. 4 is a graph showing stability of conductivity of the PEDOT/PSS film which is treated with supercritical carbon dioxide-methanol is an illustration which showing a second embodiment of the present invention in order.

Next, the inventors tested the stability of conductivity on 3 kinds of samples in which the conductivity is increased by supercritical carbon dioxide treatment. The result is shown in FIG. 4.

Of them, sample 1 and 2 are treated with supercritical carbon dioxide for an hour. Sample 3 is treated overnight with supercritical carbon dioxide.

Films having 3 kinds of different thickness (2-3 μm) are observed for 5 months in a laboratory at room temperature. As a result, any film keeping high conductivity and stability is confirmed in the sample films which improved conductivity. Especially, it is confirmed that samples 1, 2 keep conductivity as stable as sample 3. It is important to make a choice of practical treatment method.

Moreover, the inventors checked improvement of the conductivity when the PEDOT/PSS solution is changed. Specifically, 3 kinds of samples are prepared, one is of a grade for general use, and the others are 2 kinds of samples of high conductivity grade. Each sample is divided into "no treatment" in which treatment of improving the conductivity is not carried out, supercritical carbon dioxide-methanol treatment in the embodiment, and the DMSO treatment. Then, the conductivity is measured and improvement was confirmed.

The result is shown in Table 3

TABLE 3

|  | No Treatment (S/cm) | CO2-MeOH (S/cm) | DMSO (S/cm) |
|---|---|---|---|
| Aldrich | 0.10 | 45.5 | 42.0 |
| Baytron P HC V4 | 13.9 | 227 | 33.7 |
| Baytron P H500 | 0.75 | 283 | 328 |

(Methanol 4%, 35° C., 12 MPa, Treating Time: 1 h)

According to Table 3, it is confirmed that the conductivity of the Aldrich trademark product (equivalent to a grade for general use) is increased more than 400 times in any treatment compared with the untreated case.

Also, in Baytron (trademark) P HC V4 (product designation), Baytron (trademark) P H500, which is higher conductivity grade than the Aldrich product, either the supercritical carbon dioxide-methanol treatment and or the DMSO treatment shows high conductivity of the order of $10^2$ and the conductivity of DMSO treatment is slightly higher.

However, films obtained in either treatment are, practically, considered as highest level of conductivity among PEDOT/PSS film which is currently used.

As discussed above, in the embodiment, treatment is carried out by adding inexpensive methanol into the supercritical carbon dioxide. Thus, treatment cost is low compared with a method of adding expensive solvent, DMSO, and the conductivity equal to adding of DMSO is obtained.

Next, the inventors omitted procedure of the second drying and tried the supercritical carbon dioxide-methanol treatment with the first dried film 5, which was allowed to dry naturally, instead. The treatment conditions are the same as previously described. Temperature of the reaction vessel 10 is set at 35 degrees Celsius, the pressure is set at 12 MPa, and the treatment time is for an hour.

In the case of natural drying, in the same manner as previously described, a predetermined amount of the PEDOT/PSS solution 2 is collected by using the micropipette 3 having a capacity of 50 μL. The solution is applied onto the 1 cm×2 cm rectangular glass plate 4 and forms a film thereon. And then, it is allowed to dry naturally in a laboratory for 12 hours (room temperature of 25 degrees Celsius, humidity of about 50% without controlling the humidity level of the environment) to form the first dried film 5, instead of leaving it to stand overnight for drying naturally.

Then, the first dried film 5 is stored in the reaction vessel 10 and treated with the supercritical carbon dioxide-methanol under the aforementioned conditions. The treated PEDOT/PSS film 24 thus obtained is received in the drying chamber 7 and vacuum dried for 30 minutes at a temperature of 100 degrees Celsius. Then, the conductivity is calculated as 40.6 S/cm by measuring thickness of the film and resistance value.

As a result, when the process of the second drying is omitted, it is confirmed that the conductivity which is equal to the foregoing conductivity, 45.5 S/cm, is obtained.

The inventors raised temperature of the drying chamber 7 to 200 degrees Celsius and vacuum dried the treated PEDOT/PSS film 24 for 5 minutes. Change in electrical resistance value of the treated film 24 was not observed.

In the experiment, the remaining solvent is not directly evaluated. However, it is considered that little solvent remains after the vacuum drying at a temperature of 100 degrees Celsius for 30 minutes.

Accordingly, in the first dried film 5, which is naturally dried for a long time, the solvent (water) of the PEDOT/PSS solution 2 is sufficiently volatilized, and thus, it is confirmed that desired effect of improved conductivity is obtained even if the first dried film 5 is directly treated with the supercritical carbon dioxide/methanol.

Then, the first dried film 5, which is left to stand for 6 hours, is vacuum dried under conditions of 100 degrees Celsius for 30 minutes, and 200 degrees Celsius for a minute. Then, the first dried film 5 had no rupture, damage, or change on the surface. The result shows little solvent seems remaining on the first dried film 5 which is left to stand for 6 hours under the conditions in the laboratory.

Figure 5:
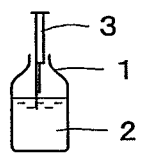
FIG. 5(a) shows a state in which a PEDOT/PSS solution used for the present invention is received.
FIG. 5(b) shows a state in which a necessary amount of the PEDOT/PSS solution is collected with a micropipette and received in a petri dish.
FIG. 5(c) shows a state in which the PEDOT/PSS solution is vacuum-dried by being received in a drying chamber after it has been allowed to dry naturally.
FIG. 5(d) shows a state in which the vacuum-dried PEDOT/PSS film is received in the reaction vessel, and in which methanol is received in the reaction vessel.
FIG. 5(e) shows a state of treatment in which supercritical carbon dioxide is formed in the reaction vessel and is penetrated into the dried PEDOT/PSS film which is dried out with methanol for reaction.
FIG. 5(f) shows a state in which the supercritical carbon dioxide is discharged after the above-mentioned treatment, the PEDOT/PSS treated film is taken out from the reaction vessel and transferred to the drying chamber, the drying chamber is heated for vacuum drying, and the solvent remaining on the treated PEDOT/PSS film is removed.
FIG. 5(g) shows a state in which the PEDOT/PSS treated film is taken out from the drying chamber.
Figure 5:
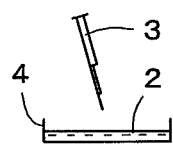
Figure 5:
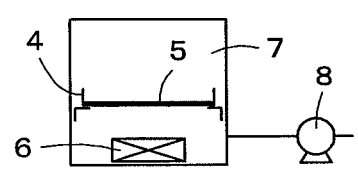
Figure 5:
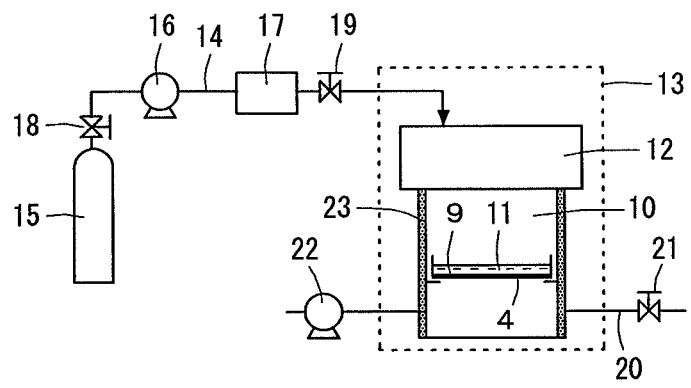
Figure 5:
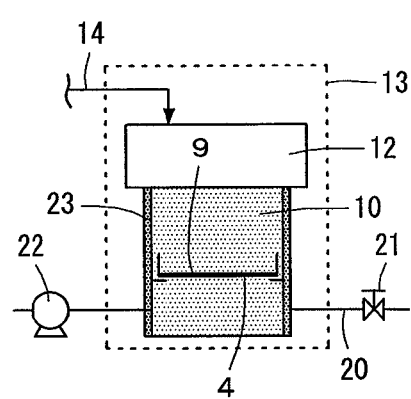
Figure 5:
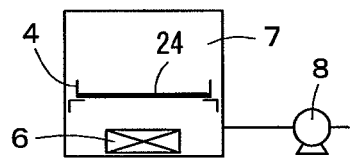
Figure 5:
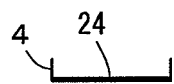

FIG. 5(*a*)-(*g*) shows a production method of the second embodiment in order, in which the components and the parts corresponding to those of the embodiment of FIG. 1 are denoted by the same reference numerals.

In the second embodiment, 2 mL of the PEDOT/PSS solution 2 is collected by using the micropipette 3 and discharged into the petri dish 4. It is left to stand for a week and the first dried film 5 is formed, which is naturally dried. This state is show in FIG. 5(*a*) (*b*).

Next, the first dried film 5 is received in the drying chamber 7 equipped with the heater 6. The drying chamber 7 is evacuated by using the vacuum pump 8 and heated to a temperature of 100 degrees Celsius and the first dried film 5 is thereby vacuum dried for 30 minutes. Then, the temperature is raised to 200 degrees Celsius and vacuum drying is continued for a minute, whereby the remaining solvent is removed, and the second dried film 9 is formed in the petri dish 4. The thickness of the second dried film 9 is about 20 μm. This state is shown in FIG. 5(c). In this case, method of forming the second dried film 9 is not restricted to the above-described example.

Then, the second dried film 9 in the petri dish 4 is received in the pressure-resistant reaction vesesl 10 having a capacity of 50 mL, 1 mL of methanol 11, the solvent for improving the conductivity, is added to the petri dish 4 in the reaction vessel 10, and the vessel 10 is sealed air tight with the cover body 12. This state is shown in FIG. 5(d).

Then, the pressure-resistant reaction vessel 10 is received in the constant temperature vessel 13, which, in this embodiment, is received in a constant-temperature tank. The pressure-resistant reaction vessel 10 is left in the constant-temperature vessel 13 for 15 minutes, keeping the temperature inside at 35 degrees Celsius.

Then, the carbon dioxide in the gas cylinder 15 is introduced into to the pressure-resistant reaction vessel 10 with the high pressure pump 16, and the reaction vessel 10 is pressurized to 12 MPa to make the carbon dioxide into the supercritical state. The supercritical carbon dioxide and methanol penetrate PEDOT/PSS second dried film 9, and the thereby treated PEDOT/PSS film 24 has properties which are improved relative to the dried film 9.

This state is shown in FIG. 5(e).

In the process of producing the treated film 24, pressure in the pressure-resistant reaction vessel 10 is stabilized, after an hour passed since the supercritical carbon dioxide starts to penetrate into the PEDOT/PSS second dried film 9, and the supercritical carbon dioxide in the pressure-resistant reaction vessel 10 is slowly released through a back pressure valve 21 to return the pressure in the vessel 10 to atmospheric pressure.

Then, the treated PEDOT/PSS film 24 is taken out from the pressure-resistant reaction vessel 10 with the petri dish 4, and they are received in the drying chamber 7.

Then the drying chamber 7 is f evacuated and heated to 100 degrees Celsius, and after thus vacuum drying the treated PETO/PSS film 24 for 10 minutes, temperature in the chamber is raised to 200 degrees Celsius and vacuum drying is continued for 5 minutes. This operation vaporizes and removes methanol remaining on the treated PEDOT/PSS film 24.

This state is shown in FIG. 5(f). In this case, the solvent remaining on the treated film 24 can be removed by ventilation drying and natural drying.

After this, the treated PEDOT/PSS film 24 is taken out from the pressure-resistant reaction vessel 10 as shown in FIG. 5(g), and the thickness and electrical resistance are measured, in the same manner as previously described, and the conductivity is calculated.

As a result, the conductivity obtained in the second embodiment is 14.7 S/cm.

In the second embodiment, the second dried film 9 is formed by using the PEDOT/PSS solution 2, which is a large amount compared with the first embodiment, a petri dish, which is a larger tool then the heretofore mentioned glass, to prepare a film, and a pressure-resistant reaction vessel 10 having a large capacity. Then, the treated PEDOT/PSS film 24 is obtained by adding the methanol onto the film 9 in the petri dish 4 in the reaction vessel 10 and penetrating the supercritical carbon dioxide into the film 9. However, the conductivity of the treated film 24 is lower than that of the first embodiment.

FIG. 6(a)-(g) shows a production method of the third embodiment in order, in which the components and the parts corresponding to those of the embodiment of FIG. 1 are denoted by the same reference numerals.

In the third embodiment, the second dried film 9 of the PEDOT/PSS is treated and improved in conductivity by adding methanol into the liquefied carbon dioxide, instead of above-mentioned supercritical carbon dioxide.

Figure 6:
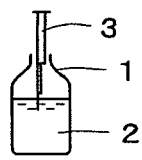
FIG. 6 is an illustration which showing a third embodiment of the present invention in order.
Figure 6:
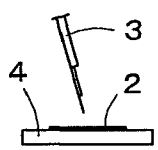
Figure 6:
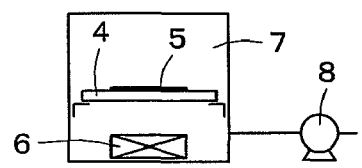
Figure 6:
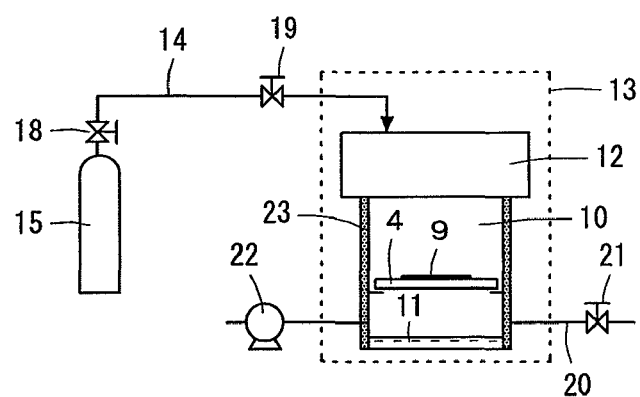
Figure 6:
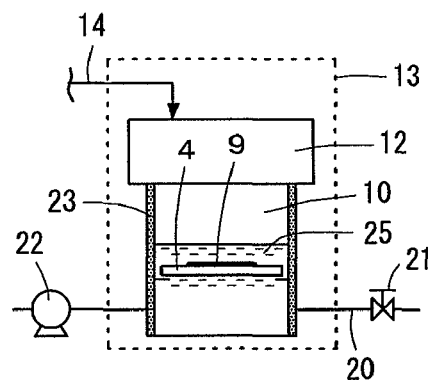
Figure 6:
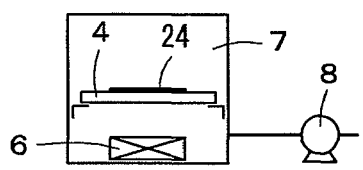
Figure 6:
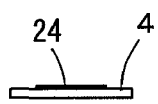

In the third embodiment, the second dried film 9 is formed in the same manner as the first embodiment as shown in FIG. 6(a)-(c). The second dried film 9 is received in the pressure-resistant reaction vessel 10 having a capacity of 24 mL together with the glass plate 4, 1 mL of the methanol 11 is added to the vessel 10 and the vessel 10 is sealed air tight with the cover body 12.

The pressure-resistant reaction vessel 10 is received in the constant temperature tank 13, and the vessel 10 communicates with the gas cylinder 15 through the conduit 14. Inserted in the conduit 14 are the on-off valves 18, 19, which allow the highly-pressurized liquefied carbon dioxide charged in the gas cylinder 15 to be introduced into the pressure-resistant reaction vessel 10. This state is shown in FIG. 6(d).

As discussed above, the conduit 14 can be constituted simply without inserting the high-pressure pump 16, the refrigeration circuit (not shown), and the heater 17.

After this, the on-off valves 18, 19 are opened, the liquefied carbon dioxide in the gas cylinder 15 is introduced into the pressure-resistant reaction vessel 10, the glass plate 4 is immersed entirely in the liquefied or pressurized carbon dioxide 25, and the valves 18, 19 are closed. This state is shown in FIG. 6(e) and is kept for an hour.

In this case, temperature in the pressure-resistant reaction vessel 10 is 28 degrees Celsius and the pressure inside is 6.4 MPa.

As discussed above, the liquefied carbon dioxide 25 forms a solution with the methanol, and the second dried film 9 is treated by being penetrated with the carbon dioxide/methanol. The treated PEDOT/PSS film 24 is has properties which are improved relative to the dried film 9.

After the above-described operation, which means after the second dried film 9 is treated, the liquefied carbon dioxide 25 is slowly released through the back pressure valve 21 to return the pressure in the pressure-resistant reaction vessel 10 to atmospheric pressure.

After this, the treated PEDOT/PSS film 24 is taken out from the pressure-resistant reaction vessel 10 together with the glass plate 4, and they are received in the drying chamber 7.

Then the drying chamber 7 is evacuated and heated 100 degrees Celsius and the treated PEDOT/PSS film 24 is thereby vacuum dried for 30 minutes whereby methanol remaining on the treated PEDOT/PSS film 24 is vaporized and removed. This state is shown in FIG. 6(f).

After this, the treated film 24 is taken out from the drying chamber 7 as shown in FIG. 6(g), and the thickness and electrical resistance are measured to calculate the conductivity.

In this embodiment, the conductivity of 44.6 S/cm is obtained.

As discussed, in the third embodiment, when pressurized carbon dioxide is used, it is confirmed that the conductivity of the PEDOT/PSS film is improved even with lower temperature and pressure than that of supercritical carbon dioxide.

Moreover, in the embodiment, the high-pressure pump 16, the refrigeration circuit (not shown), and the heater 17 are omitted, liquefied carbon dioxide in the gas cylinder 15 is utilized, and, thus, the process is carried out with inexpensive and simple equipment.

In this case, it is considered important that the glass plate 4 is immersed entirely in the liquefied carbon dioxide 25. Gaseous carbon dioxide is not used in the embodiment since it does not make a miscible state with an organic solvent such as methanol.

As discussed above, in the present invention, a dried film obtained from a solution of a conductive polymer and a dopant is treated with a predetermined solvent and pressurized carbon dioxide, or liquefied carbon dioxide or subcritical or supercritical carbon dioxide, in the reaction vessel, and the solvent and pressurized carbon dioxide are penetrated into the dried film. This improves the properties quickly in a simple manner and significantly enhances the conductivity of the treated film 24.

Next, the inventors carried out the next experiment as the fourth embodiment with the intention of improving the conductivity of the treated film 24 and accurate verification.

In the process of forming the first and second films 5, 9 of the first embodiment, a spin coat method is adopted instead of vacuum drying in the drying chamber 7 after natural drying to attempt to make the second dried film 9 thinner and to manufacture the film 9 quickly.

Specifically, the PEDOT/PSS solution 2 to be used is filtered through a microfilter (not shown) having a mesh of about 0.2 μm and used, a glass slide is cut into 1.5×2.5 cm rectangles which are subjected to ultrasonic cleaning (15 minutes) in pure water and drying prior to use.

30 μL of the PEDOT/PSS solution 2 is collected and spread on the glass plate 4. And then, the solution is received in the spin coater and spin coated at 3000 rpm for 30 sec to form a film. The film is vacuum dried for 30 minutes at a temperature of 100 degrees Celsius, whereby the second dried film 9, which is preliminary dried film, is obtained.

Then, the second dried film 9 with the glass plate 4 is received in the pressure-resistant reaction vessel 10, and the organic solvent 11, such as methanol, is added to the reaction vessel 10 which is then sealed air tight and kept at a constant temperature by means of a water bath. Then, carbon dioxide is introduced into the pressure-resistant reaction vessel 10 to a predetermined pressure of 6.2 Mpa and stirred slowly for 2 minutes to make a uniform phase.

The stirring is stopped and the carbon dioxide/methanol is left to stand for 30 minutes, releasing the carbon dioxide at a constant rate (0.5 MPa/min). The pressure in the reaction vessel 10 is returned to below atmospheric pressure and the glass plate 4 is taken out.

Then, the glass plate 4 is stored in the drying chamber 7 and vacuum dried for 30 minutes at 100 degrees Celsius. Then, the thickness and electrical resistance of the treated film are measured. The thickness of the sample of the treated film 24 was 0.05-0.12 μm.

The electrical resistance of the treated film 24 is measured by four probe method using a resistance thermometer and the thickness of the film is measured by step measurement using a surface roughness meter. When calculating the conductivity of the treated film 24, resistivity correction factor and calculation formula are the average value of two or more experiments based on the calculation formula, which is the same as the first embodiment.

As a result of the experiment, the conductivity of the untreated film produced from the PEDOT/PSS solution 2 is less than 0.1 S/cm, which is lower than the PEDOT/PSS film in which low molecular dopant is used.

Table. 4 shows a relation between kinds of solvent and the conductivity when supercritical carbon dioxide treatment-organic solvent mixture treatment is carried out.

TABLE 4

| Solvent | Conductivity (S/cm) | Relative Permittivity |
|---|---|---|
| None | ※ 0.0875 | — |
| $CH_3OH$ | ※ 35.3 | 33 |
| $C_2H_5OH$ | 1.08 | 24 |
| 2-PrOH | 0.0495 | 18 |
| Ethylene glycol | ※ 86.4 | 39 |
| DMSO | ※ 80.2 | 49 |
| DMF | 39.3 | 37 |
| NMP | 48.7 | 32 |

(35° C., 12 MPa, 30 minutes, Amount of Solvent 4 vol %)
※ indicate average value of 5 times experiments, others indicate average value of 2 times.

In Table 4, in case of treating only with the supercritical carbon dioxide without adding an organic solvent, the conductivity is equal to the untreated film. On the other hand, when an alcohol solvent DMSO, amide solvent (DMF (N,N-dimethylformamide)), or NMP (N-methylpyrrolidone) is used together with the supercritical carbon dioxide, significant improvement of the conductivity is observed.

Specifically, the conductivity improved about 1000 times with the use of a solvent such as ethylene glycol and DMSO, and 400 times with the use of methanol. Improved conductivity was not observed in low polar solvent or aprotic polar solvent.

It has already been reported that addition of an organic solvent enhances the conductivity when forming PEDOT/PSS film.

Figure 7:
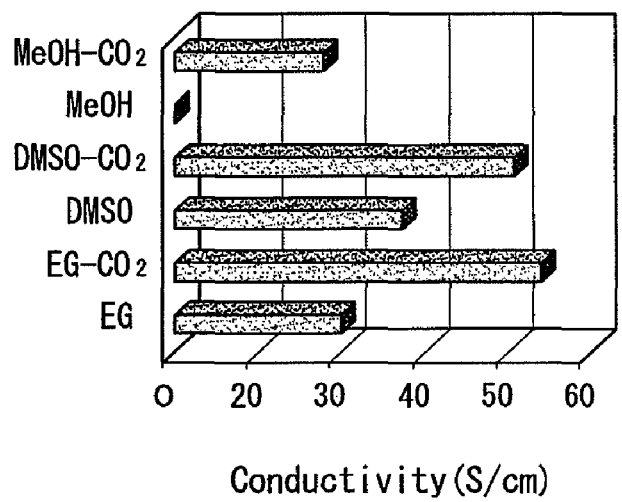
FIG. 7 shows the relation between the treating conditions of a PEDOT/PSS film and the conductivity in a fourth embodiment of the present invention.

FIG. 7 shows comparison of conductivity between conventional method and supercritical carbon dioxide-organic solvent mixture treatment of the present invention. It is recognized from FIG. 7 that the method of the invention, with the use of methanol, improves conductivity significantly, which has not been reported up to now.

With the use of DMSO or ethylene glycol as organic solvent, the conductivity becomes higher when supercritical carbon dioxide-organic solvent mixture treatment is carried out than when the solvent by itself is used.

Mechanism of conductivity enhancement has not yet been proven, but it is considered that the result is due to synergistic action of polymer chain plasticization by supercritical carbon dioxide and molecular chain rearrangement caused by organic solvent.

Table 5 shows a relation between the carbon dioxide phase state and the conductivity when treatment is carried out.

TABLE 5

| Solvent | $CO_2$ (MPa) | Temperature (° C.) | Conductivity (S/cm) | Phase State |
|---|---|---|---|---|
| Methanol | 12 | 35 | 33.8 | Supercritical |
| Methanol | 6.2 | 28 | 35.3 | Liquid |
| Methanol | — | — | 0.0759 | |
| DMSO | 12 | 35 | 80.2 | Supercritical |
| DMSO | 6.1 | 28 | 85.2 | Liquid |
| DMSO | — | — | 54.0 | |
| Ethylene glycol | 12 | 35 | 65.8 | Supercritical |
| Ethylene glycol | 6.3 | 28 | 86.4 | Liquid |
| Ethylene glycol | — | — | 39.8 | |

In supercritical state, carbon dioxide and organic solvent make a uniform phase in the reaction vessel 10.

On the other hand, under condition of critical point or lower, when carbon dioxide is introduced, liquefied carbon dioxide accumulates in the reaction vessel 10 from the bottom, a small amount of organic solvent appears in the dissolved liquefied carbon dioxide phase, and the sample is immersed in the solution.

The conductivity of the PEDOT/PSS film is very high in both supercritical carbon dioxide and liquefied carbon dioxide and there is little difference between them. When liquefied carbon dioxide is used, pressure of carbon dioxide can be lowered. However, it needs to be observed that the sample inside is below the liquid level of the liquefied carbon dioxide. It is necessary to check the liquid level for safety reasons to prevent sudden rise in pressure caused by liquid seal.

Meanwhile, supercritical carbon dioxide needs higher pressure, but observation is unnecessary because it forms uniform phase.

Figure 8:
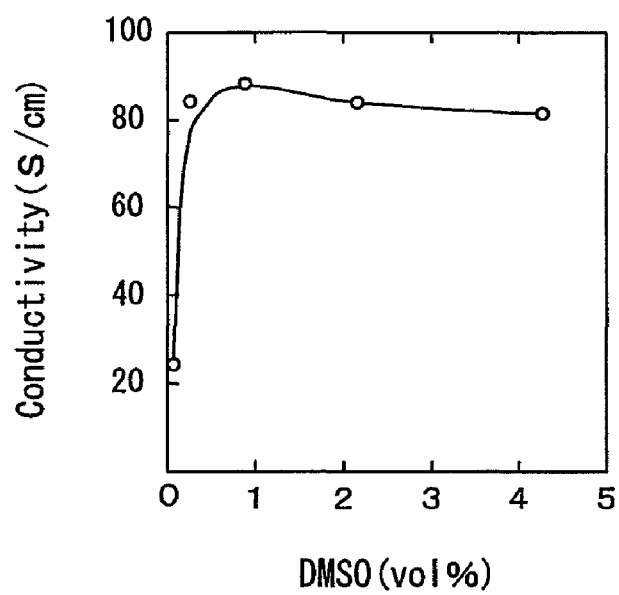
FIG. 8 shows the relation between the amount of DMSO and the conductivity in supercritical carbon dioxide-DMSO treatment in the fourth embodiment of the present invention.

FIG. 8 shows effect of DMSO amount on conductivity in supercritical carbon dioxide-DMSO treatment. Addition of 10 μL to the reaction vessel 10 (24 mL) shows clear additive effect, and when hundreds of μL or more is added, the conductivity remains substantially constant.

Figure 9:
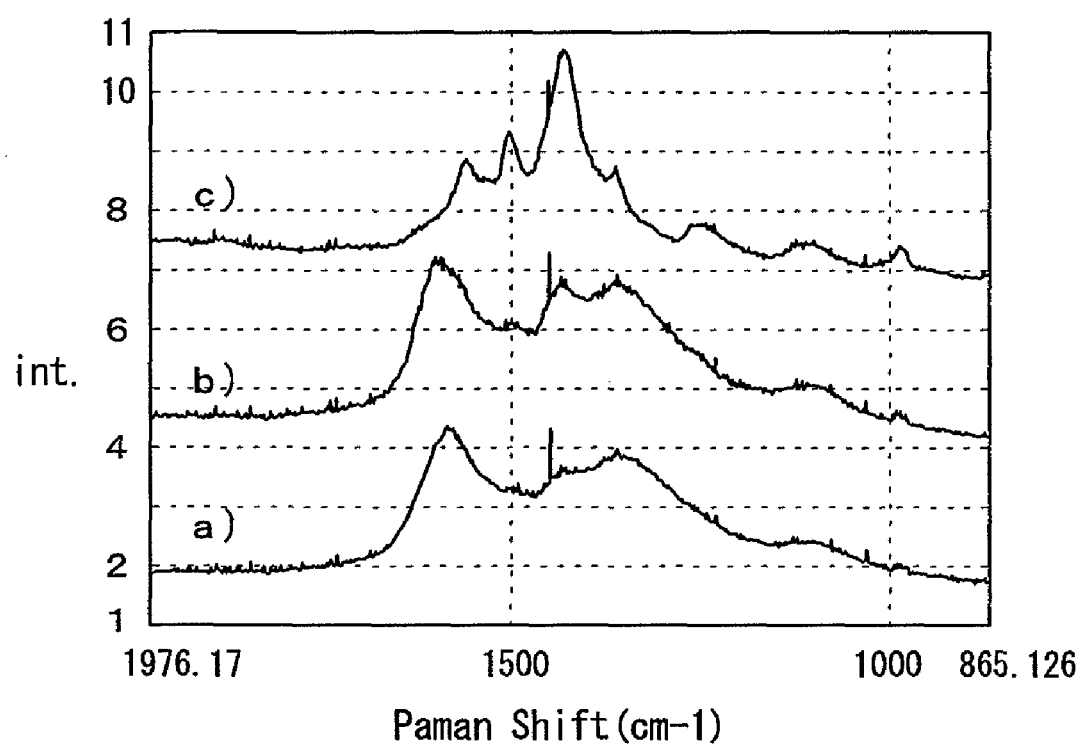
FIG. 9 shows Raman scattering spectra of the PEDOT/PSS film in a fourth embodiment of the present invention comparing untreated, a treatment with supercritical carbon dioxide alone, and a mixed treatment with supercritical carbon dioxide-methanol.

FIG. 9 shows Raman scattering spectra of PEDOT/PSS film and samples which showed improved conductivity in FIG. 9 have a peak sharp.

Of them, the peak around 1430 cm−1 corresponds to Ca-Cb stretching vibration. Before the treatment is carried out, the peak was wide and weak. However, after the supercritical carbon dioxide-methanol treatment is carried out, strong peak was observed. It is considered that this corresponds to increase of quinoid skeleton. Molecular chain is more likely to be stretched in quinoid skeleton and favorable to interchain electron transfer, which is interpreted that the conductivity is increased as a result.

As discussed above, in the fourth embodiment, in the process of forming the second dried film 9, the first dried film 5 is spin coated to be made thinner instead of being vacuum dried in the drying chamber 7 after being received naturally dried, which speeds up the film-forming operation. The second dried film 9 is treated storing in the reaction vessel 10. The thus treated film 24 is thinner and has improved conductivity. The film 24 is obtained easily and inexpensively.

The treated film 24 has increased transparency due to its thinness. The treated film 24 is suitable for use as flexible transparent electrode and transparent electromagnetic shielding film, as a substitute for transparent conductor such as ITO (indium tin oxide).

Furthermore, the inventor carried out the following experiment as the fifth embodiment to obtain optimum conditions for film-forming process of the second dried film 9 in the reaction vessel 10.

Specifically, as the film-forming environment, in the first and second embodiment, liquefied carbon dioxide is introduced, the pressure in the reaction vessel 10 is set to 12 MPa, and supercritical carbon dioxide and methanol are penetrated in the second dried film 9. In the third embodiment, liquefied carbon dioxide is introduced, the pressure in the reaction vessel 10 is set to 6.4 MPa, and liquefied carbon dioxide and methanol penetrate into the second dried film 9 instead of supercritical carbon dioxide. In the fourth embodiment, liquefied carbon dioxide is introduced and the pressure in the reaction vessel 10 is set to 6.2 MPa, and liquefied carbon dioxide and methanol penetrate into the second dried film 9 instead of supercritical carbon dioxide.

Then, although the respective environments are different, enhancement of the conductivity is confirmed, and thus, conditions of film-forming are reviewed.

Figure 10:
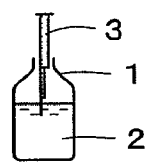
FIG. 10 is an illustration which showing a fifth embodiment of the present invention in order.
Figure 10:
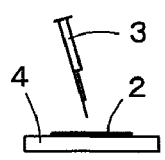
Figure 10:
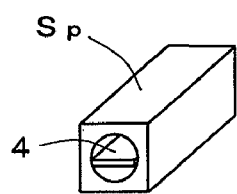
Figure 10:
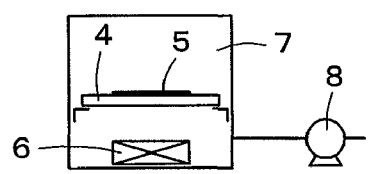
Figure 10:
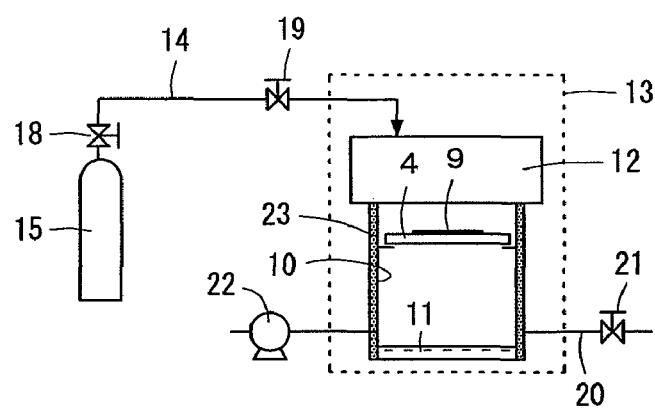
Figure 10:
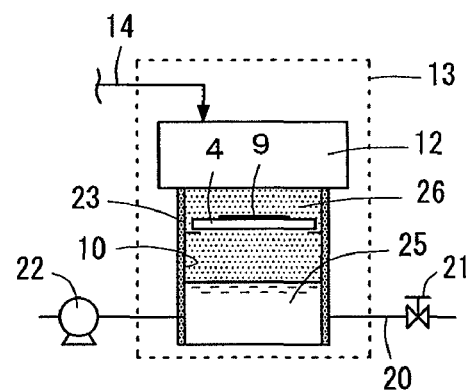
Figure 10:
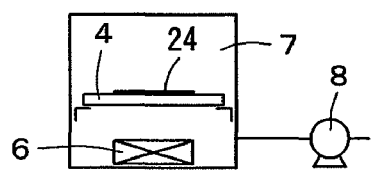
Figure 10:

The experiment is conducted the same manner as the fourth embodiment as shown in FIG. 10. 40 μL of the PEDOT/PSS solution 2 is collected as shown in FIG. 10(a), spread it on the glass plate 4 and stored in the spin coater $S_p$, and spin coated at 3000 rpm, 30 sec to form a film as shown in FIG. 10(c). The film is vacuum dried for 30 minutes at 100 degrees Celsius as shown in FIG. 10(d), and the second dried film 9, which is a preliminary dried film, is obtained.

In this way, spin coat method makes the second dried film 9 thinner and form the film quickly. The second dried film 9 and the glass plate 4 are stored in the pressure-resistant reaction vessel 10 as shown in FIG. 10(e), the organic solvent 11, such as methanol, is added to the reaction vessel 10 and air tightened and kept at a constant temperature of 28 degrees Celsius by water bath.

After this, pressurized carbon dioxide having a pressure of 0.5 MPa is introduced in the pressure-resistant reaction vessel 10 and stirred slowly for 2 minutes.

Then, the glass plate 4 and the second dried film 9 are arranged slightly upward in the reaction vessel 10 than the above-mentioned embodiment, and the organic solvent 11 and low pressurized carbon dioxide 25 are accumulated under the glass plate 4. A mixed vapor of gaseous carbon dioxide and a small amount of the organic solvent 11 is present above the liquid level. The glass plate 4 and the second dried film 9 are left to stand in the vapor phase air-fuel mixture 26. This state is shown in FIG. 10(f).

Accordingly, in this embodiment, the glass plate 4 and the second dried film 9 are not immersed in the organic solvent 11 and the liquefied carbon dioxide as previously described. Thus, the inside observation, which confirms the sample is below the liquid level of the liquefied carbon dioxide, is not necessary. It can be carried out easily and rationally and at the same time usage of the organic solvent 11 and pressurized carbon dioxide are reduced.

Moreover, the pressurized carbon dioxide 25 which is introduced to the reaction vessel 10 is at low pressure, as previously described. Substantial environment for film forming is obtained easily by using carbon dioxide gas having pressure of 0.1 MPa to 7.0 MPa. Inexpensive film-forming equipment, increased productivity, and mass production can be achieved.

After this, the stirring is stopped and left to stand for 30 minutes and the carbon dioxide is released at a constant rate (0.5 MPa/min) as shown in FIG. 10(g). The pressure in the reaction vessel 10 is returned to atmospheric pressure or below and the glass plate 4 is taken out as shown in FIG. 10(h). The glass plate 4 is stored in the drying chamber 7 and vacuum dried in the drying chamber 7 at 100 degrees Celsius for 30 minutes. Then, the thickness and electrical resistance of the treated film are measured. As a result, high conductivity of 83.1 S/cm is obtained, and the result is similar to the fourth embodiment.

After the experiment is done, another experiment was carried out by introducing pressurized carbon dioxide gas having a pressure of 2.0 MPa and 5.3 MPa under the similar conditions, and effective results are obtained, respectively.

Thus, it is estimated that the above-described result is obtained under the similar experiment conditions when introducing much lower pressurized carbon dioxide gas, for example, having a pressure of 0.1 MPa. When much higher pressurized carbon dioxide gas, for example, having a pressure of 7.0 MPa is introduced, it is estimated that the above described result is obtained by adjusting a mounting height of the glass plate 4 and the second dried film 9, adjusting temperature in the reaction vessel 10, and preventing the glass plate 4 and the second dried film 9 from immersing in the liquid level.

As discussed above, similar result as the fourth embodiment is obtained by using low pressurized carbon dioxide gas and the organic solvent 11. The reason is unclear, however, the result presumably due to synergistic action of carbon dioxide gas and the organic solvent 11.

As discussed above, a method for producing a conductive polymer film of the present invention is suitable for, for example, enhancing electrical conductivity of PEDOT/PSS film, capable of being manufactured quickly and at low cost with simple operation, enhancing electrical conductivity of PEDOT/PSS film significantly, and obtaining stable properties of the film.

The invention claimed is:

1. A method of producing a conductive polymer film comprising the steps of:
   drying a solution of a conductive polymer and a dopant thereof to obtain a dried film;
   and treating, in a reaction vessel, the dried film obtained from the solution with a predetermined organic solvent and pressurized carbon dioxide.

2. A method of producing a conductive polymer film according to claim 1, wherein the pressurized carbon dioxide is subcritical or supercritical carbon dioxide, liquefied carbon dioxide, or pressurized carbon dioxide gas.

3. A method of producing a conductive polymer film according to claim 2, wherein the pressurized carbon dioxide is subcritical or supercritical carbon dioxide, and the dried film is treated in a uniform phase made by the organic solvent and subcritical or supercritical carbon dioxide.

4. A method of producing a conductive polymer film according to claim 2, wherein the pressurized carbon dioxide is a liquefied carbon dioxide, and the dried film is treated in a liquid phase made by the liquefied carbon dioxide and the organic solvent.

5. A method of producing a conductive polymer film according to claim 2, wherein the pressurized carbon dioxide is the pressurized carbon dioxide gas, and the dried film is treated in a vapor phase made by the pressurized carbon dioxide gas and the organic solvent.

6. A method of producing a conductive polymer film according to claim 5, wherein the pressurized carbon dioxide gas has a pressure of 0.1 MPa to 7.0 MPa.

7. A method of producing a conductive polymer film according to claim 1, wherein the conductive polymer is poly-3,4-ethylenedioxythiophene and the dopant is polystyrene sulfonic acid.

8. A method of producing a conductive polymer film according to claim 1, wherein the organic solvent comprises a highly polar solvent.

9. A method of producing a conductive polymer film according to claim 8, wherein the organic solvent comprises methanol, ethylene glycol, or dimethyl sulfoxide.

10. A method of producing a conductive polymer film according to claim 1, further comprising the step of removing the organic solvent remaining on the dried film after the treatment step.

* * * * *